United States Patent [19]
Tamura et al.

[11] 4,091,673
[45] May 30, 1978

[54] TEMPERATURE SENSOR FOR USE IN A HEATED ROLL

[75] Inventors: Takashi Tamura; Tsuneo Matsuzaki; Jyunkichi Kasahara; Ken Nakamura, all of Hachioji, Japan

[73] Assignee: Konishiroku Photo Industry Co. Ltd., Tokyo, Japan

[21] Appl. No.: 737,669

[22] Filed: Nov. 1, 1976

[30] Foreign Application Priority Data
Nov. 8, 1975 Japan ................................. 50-134469

[51] Int. Cl.² ............................................ G01K 13/08
[52] U.S. Cl. .......................................... 73/351; 432/60
[58] Field of Search ............... 73/351, 359 R; 432/60, 432/75, 228; 219/216

[56] References Cited
U.S. PATENT DOCUMENTS

| | | | |
|---|---|---|---|
| 1,942,519 | 1/1934 | Packard | 73/359 |
| 3,690,176 | 4/1971 | Connolly | 432/60 |
| 3,941,558 | 3/1976 | Takiguchi | 432/60 |

OTHER PUBLICATIONS

L.R. Keltner, "Meas. Temperatures of Calendar Rolls", India Rubber World, p. 60, Feb. 1, 1929.

*Primary Examiner*—Anthony V. Ciarlante

[57] ABSTRACT

A temperature sensing device for a heated roll, which includes an insulated support member and a thermocouple of bimetallic foil extending around the support member for sensing the surface temperature of the heated roll, and a resilient member interposed between the thermocouple and the insulated support member for pressing the thermocouple in abutment against the surface of the heated roll so as to increase the contact area therebetween.

12 Claims, 3 Drawing Figures

TEMPERATURE SENSOR FOR USE IN A HEATED ROLL

BACKGROUND OF THE INVENTION

1. Filed of the Invention

This invention relates to a temperature sensor for a heated roll and, more particularly, to a temperature sensing device applicable to the heated roll fixing system of electrostatic copying machine.

2. Description of Prior Art

A heated roll fusing system is well known in the art as a fusing system in electrophotography which is advantageous in its thermal efficiency and low possibility of causing fire. In such a fusing system, normally, the heated fuser roll has a heater therewithin and has its surface covered with an inadhesive material such as, for example, tetrafluoroethylene resin or the like, for preventing the roll surface from adhesion of toner. Also, the pressure roll of metal has its outer peripheral surface covered with a resilient, inadhesive material such as, for example, silicon rubber or the like which prevents adhesion of the toner.

In addition, the temperature of the heated fuser roll surface is controlled within a temperature range predetermined according to feed rate of support material carrying toner images and physical properties of a toner material in order to effect desirable fixing without being involved in so called "offset" process. For this purpose, the fusing system is necessarily provided with a temperature sensing device for detecting the roll surface temperature to determine if it is getting higher or lower than the predetermined temperature range. The temperature sensing device is connected to a control system responsive to the sensed temperature for controlling the heater so as to maintain the roll surface temperature within the predetermined temperature range.

A fusing system has been proposed in the art having its temperature sensing device disposed within the heated fuser roll which is rotated during operation. This requires a complicated construction which increases costs and presents other problems, and may produce faulty copies. Also, another fusing system is well known in the art having its temperature sensing device disposed in direct contact with the surface of the heated fuser roll. However, as mentioned above, the heated fuser roll has its surface covered with a resin film which is softer than the metal sensing member and which is heated in operation to a temperature of hundreds degrees. Therefore, the sensing member is apt to scratch and injure the surface of the heated roll, causing toner images contacted with the scratched surface to be unfixed. The removal of the resinous layer caused by excessive wear will result in encountering such accidents that copying papers carrying toner images are stained or wound round the heated roll.

SUMMARY OF THE INVENTION

The present invention provides a temperature sensing device for a heated roll including an insulated support member, a thermocouple of bimetallic foils extending around the insulated support member and a resilient member interposed between the support member and the thermocouple.

The resilient member serves both to press the thermocouple foils into abutment against the peripheral surface of the heated roll so as to increase the contact area therebetween and to prevent the surface of the roll from being injured. Moreover, it is possible to perform rapid and reliable detection of a temperature of the surface of the heated roll even when the detection is carried out by indirectly contacting the sensing device with the heated roll surface through a thin web.

It is, accordingly, an object of the present invention to provide a temperature sensing device for a heated roll, which can protect the heated roll surface from injury when the device is in direct contact with the roll surface.

Another object of the present invention is to provide a heat sensing device which can improve temperature sensing accuracy even when a thin web is provided between the sensor and the heated roll.

A further object of the present invention is to provide a heat sensor device useful for a fusing system in electrophotographic apparatuses.

Further objects, features and advantages of the invention will become apparent as the invention is described more particularly hereafter in connection with a preferred embodiment of the invention which is employed by way of example as a heat sensing device used in a fusing system for fusing toner images in electrophotography, reference being had to the accompanying drawings.

DESCRIPTION OF THE PREFERRED EMBODIMENTS

Figure 1:
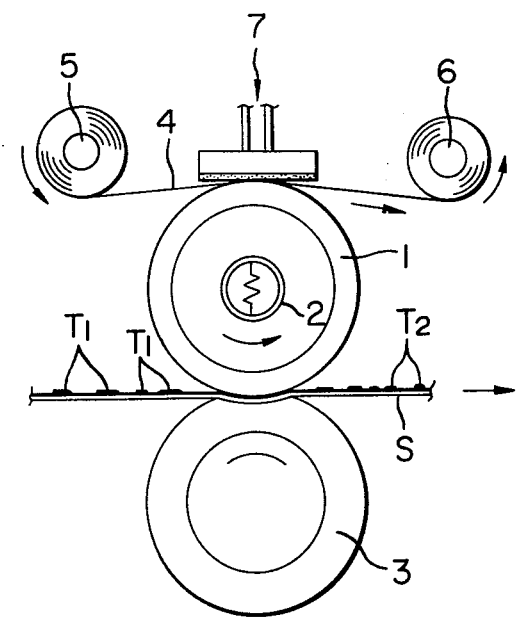
FIG. 1 is a schematic vertical sectional view of a fusing system to which a temperature sensing device in accordance with the present invention is applied.
Figure 3:
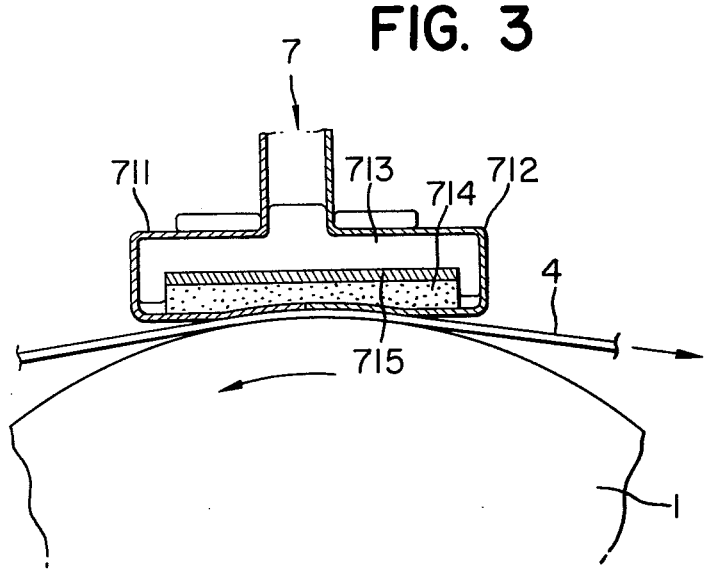
FIG. 3 is an enlarged vertical sectional view taken along line A — A of FIG. 2, showing the temperature sensing device of FIG. 1 to a larger scale.
Figure 2:
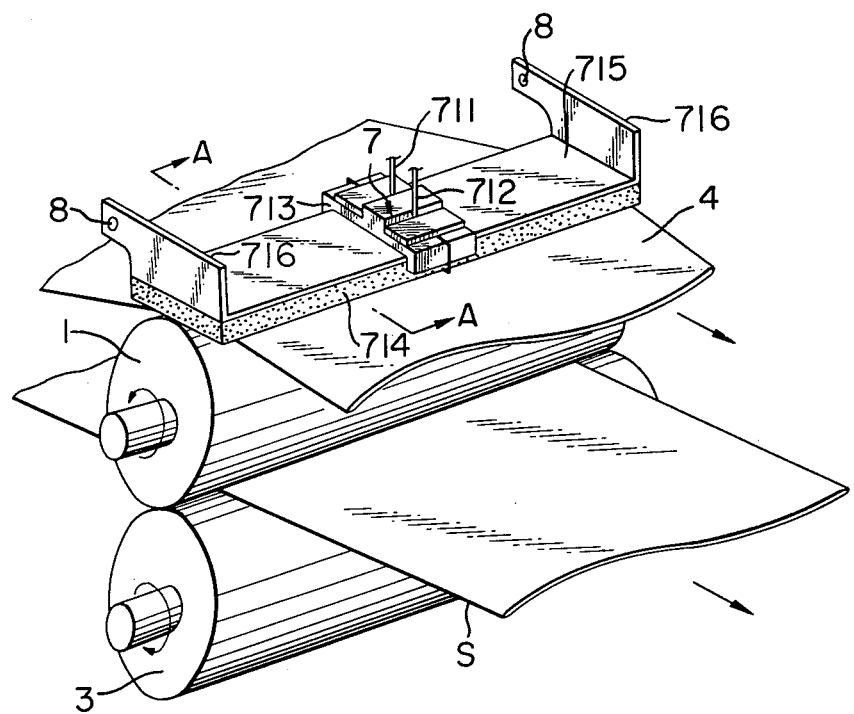
FIG. 2 is a perspective view of FIG. 1.

Referring now to FIGS. 1 to 3 there is illustrated an embodiment of a fusing system in which a temperature sensing device in accordance with the present invention is applied. The fusing system includes a heated fuser roll 1 having a heater 2 therewithin and its cylindrical metal surface coated with a tetrafluoroethylene resin layer inadhesive relative to the toner. The heated fuser roll 1 is coupled to a suitable driving means (not shown) for rotation in the direction indicated by the arrow. A pressure roll 3 is disposed in pressure contact with the heated fuser roll 1 and rotated in the same direction and substantially at the same rate as the heated fuser roll 1. The pressure roll 3 has its metal surface covered with a heat-resisting, resilient silicon rubber inadhesive relative to the toner. As is shown in the figures, a support material S (hereinafter referred to as a copy sheet) on which toner powder image $T_1$ is transferred is passed between the heated fuser roll 1 and the pressure roll 3 during the image fixing process.

The reference numeral 4 indicates a heat-resisting, thin cleaning web having a thickness of 0.1 to 0.15 mm, extending between a web supply spool 5 and a web take-up spool 6, which is provided, as shown in the figures, to come into contact with heated fuser roll surface for removing fused toners adhering to the surface of the heated fuser roll 1 to prevent the fused toner adhering to the heated fuser roll surface being transferred to the next sheet or being applied to the surface of the pressure roll 3 after the copy paper passes. The take-up spool 6 is coupled to a suitable means for intermittently feeding the cleaning web 4. Available materials for the cleaning web are, for example, a heat-resisting, thin non-woven fabric sold under the trademark Nomex E-54A by Du Pont de Nemours & Co. and a non-woven fabric of glass fiber made by Honshu Paper Co., Ltd. The use of such a cleaning web will not cause the temperature sensing device to be degraded in its responsive performance relative to temperature changes on the heated fuser roll surface.

The reference numeral 7 indicates a temperature sensing device in accordance with the present invention which has its temperature sensing portion in pressure contact with the back face of the cleaning web 4 for sensing through the cleaning web 4 the surface temperature of the heated fuser roll 1. Of course, the temperature sensing device 7 is connected to a suitable temperature control system (not shown). The temperature control may be effected by increasing or decreasing the power to be supplied to the heater 2, or alternatingly turning on and off the heater 2 when the temperature on the surface of the heated roll gets out of the predetermined temperature range, or in some other manners known in the art.

Turning now to the FIG. 3 showing a temperature sensing device 7 in accordance with the present invention in an enlarged representation, two kinds of thin metal strips 711 and 712, having a prefereble thickness of about 0.05 mm and a preferable width of about 1 mm, such as, for example, copper and constantan metal foils, or chromeru and alumeru metal foils, are connected to each other at their respective ends so as to form a pliable, flexible, thin metal foil as a thermocouple. The thermocouple foils 711 and 712 extend around an insulating support member 713 in a head-band fashion for preventing the interconnection of the foils at any portion except for the junction ends. A heat-resisting resilient member 714 having a small thermal conductivity is interposed between the insulating support member 713 and the thermocouple foils 711 and 712, said resilient member, preferably, extending substantially over the length of the heated fuser roll 1 along its axis. The thermocouple foils 711 and 712 is brought into close contact with the cleaning web 4 by the weight of the temperature sensing device itself or a suitable additional force. There may also be provided an insulating plate 715 which supports fixedly in a suitable manner, for example by adhesion, both the support member 713 on its upper surface and the resilient member 714 on the lower surface, said insulating plate 715 extending the length of the resilient member 714. At each end of the insulating plate 715, an arm 716 having a through-hole 8 projects upwardly to support the temperature sensing device in a rotatable manner about pivot pins fitted in the through-holes (note FIG. 2). As is shown in FIG. 3, the resilient member 714 is depressed in an arc in accordance with the resilient deformation of the thermocouple foils, causing a restoring force therein to press the thermocouple in abutment against the cleaning web 4 so as to increase the contact area of the thermocouple foils relative to the heated fuser roll surface through the thin cleaning web 4.

In comparison with the contact area obtained between the thermocouple foils and the heated fuser roll surface without the use of the resilient member 714, the contact area obtained in accordance with the above configuration is larger to provide a rapid and reliable temperature control. Available material for the resilient member are, for example, a heat-resisting felt sold under the trademark Nomex-Felt by Du Pont De Nemours & Co., and under the trademark Kinor-Felt by Nippon Kinor Co., Ltd. and an inorganic, heat-resisting sponge sold under the trademark Litoflex by Nippon Asbestos Co., Ltd. The resilient member may have a thickness of about 1 to 20 mm, preferably of about 2 to 5 mm.

The operation of the present invention is as follows: The heated fuser roll 1 and the pressure roll 3 are rotated in pressure contact with each other and by means of a suitable sheet feeding mechanism, supplied therebetween with a copying sheet S on which toner powder images $T_1$ are carried. The surface of the heated fuser roll 1 directly contacts the toner images to fuse them on the copying sheets in sequence with the heated roll 1 remaining in pressure contact with the copying sheet. The toner particles are more strongly attracted adhesively to the copying sheet than the heated fuser roll surface, and therefore, remain on the copying sheet in a fused condition, passing between the rolls 1 and 3. Thereafter, the fused toner images $T_2$ are air-cooled become fixed on the copying sheet. The fuser toner adhering to the surface of the heated fuser roll 1 during this fusing process can be removed by the cleaning web 4.

During this fusing process, the thermocouple foils 711 and 712 are sensing the surface temperature of the heated fuser roll 1 through the cleaning web 4, generating a thermoelectric force to actuate a temperature control system (not shown) for controlling the heater 2 so as to maintain the surface temperature of the heated fuser roll 1 within a predetermined temperature range.

Although the temperature sensing device of the present invention has been described with reference to a fixing system in cooperation with a cleaning web for convenience of illustration, the thermocouple foils may be used in direct contact with the heated fuser roll. In this case any suitable cleaning means can be employed. The thermocouple foils, because of their high flexibility, can conform readily to the deformation of the resilient member in pressure contact with the heated roll surface. This can minimize the possibility of the metal foil injuring the heated fuser roll surface, and provides a rapid and positive temperature control in comparison with the devices of the prior art.

While the invention has been particularly shown and described with reference to preferred embodiments thereof, it will be understood by those skilled in the art that the temperature sensor of the invention is applicable to detect a surface temperature of a variety of heated rolls, such as for drying sheet materials, for heating resin sheets, and so on.

What is claimed is:

1. In a heated roll fixing system for fusing toner images, including a rotatable heated fuser roll, a pressure roll disposed in pressure contact with said heated fuser roll to form a nip through which a support material carrying thereon toner images is moved to fuse the toner images on said support material, a cleaning web extending between a web supply spool and a web take-up spool, said web being positioned to contact the peripheral surface of said fuser roll to remove fused toner particles deposited on said surface, a temperature sensing device for said heated fuser roll comprising:
    an insulated support member;
    a thermocouple extending around and being supported by said insulated support member; and
    a resilient member interposed between said insulated support member and said thermocouple, said temperature sensing device being positioned so that at least a portion of said thermocouple is in thermal contact with the peripheral surface of said heated fuser roll.

2. The system of claim 1, wherein said thermocouple comprises a pair of metallic foils of different material, one end of each foil being joined together, said foils extending around said insulated support member.

3. The system of claim 1, wherein said resilient member comprises a layer of resilient, heat-resistant material.

4. The system of claim 1, further comprising a second support member pivotally supported relative to said heated fuser roll, said resilient member being disposed on a side of said second support member adjacent to said rolls and said insulated support member being disposed on a side of said second support member directed away from said roll.

5. The system of claim 1, wherein said temperature sensing device is positioned to be in thermal contact with said heated fuser roll through said cleaning web.

6. A temperature sensing device for a heated roll, comprising: an insulated support member; a thermocouple extending around and supported on said insulated support member, and a resilient member interposed between said insulated support member and said thermocouple.

7. The device of claim 6, wherein said thermocouple comprises a pair of metallic foils of different materials, one end of each foil being joined together, said foils extending around said insulated support member.

8. The device of claim 6, wherein said resilient member comprises a layer of resilient, heat-resistant material.

9. The device of claim 6, further comprising a second support member, said resilient member being supported on one side of said second support member, said insulated support member being disposed on the opposite side of said second support member, and said thermocouple extending around said insulated support member, said resilient member, and said second support member.

10. A method for sensing the temperature of the peripheral surface of a heated roll comprising pressing a thermocouple of bimetallic foil against the surface of said heated roll, said thermocouple having a backing of resilient material supported by an insulated support element, said thermocouple being maintained in intimate contact with the arcuate surface of said heated roll by depression of said resilient material.

11. A method as recited in claim 10, wherein the step of pressing said thermocouple includes placing said thermocouple in direct contact with the surface of said heated roll.

12. A method as recited in claim 10, wherein the step of pressing said thermocouple includes placing said thermocouple in indirect contact with the surface of said heated roll through a thin roll-cleaning web.

* * * * *